(12) United States Patent
Poe

(10) Patent No.: US 6,343,815 B1
(45) Date of Patent: Feb. 5, 2002

(54) CINCH-UP LATCH

(75) Inventor: L. Richard Poe, Palm Desert, CA (US)

(73) Assignee: Hartwell Corporation, Placentia, CA (US)

( * ) Notice: Subject to any disclaimer, the term of this patent is extended or adjusted under 35 U.S.C. 154(b) by 0 days.

(21) Appl. No.: 09/680,169

(22) Filed: Oct. 4, 2000

(51) Int. Cl.$^7$ ................................................ E05C 5/00
(52) U.S. Cl. ................................ 292/113; 292/DIG. 31
(58) Field of Search ........................... 292/113, 56, 71, 292/63, 66, 109, DIG. 31

(56) References Cited

U.S. PATENT DOCUMENTS

| | | | |
|---|---|---|---|
| 4,318,557 A | | 3/1982 | Bourne et al. .............. 292/113 |
| 4,549,708 A | * | 10/1985 | Norris ...................... 244/129.4 |
| 4,602,812 A | * | 7/1986 | Bourne ....................... 292/113 |
| 4,743,052 A | * | 5/1988 | Stammreich et al. ....... 292/113 |
| 4,768,815 A | * | 9/1988 | Harmon ..................... 292/113 |
| 4,858,970 A | * | 8/1989 | Tedesco et al. ............. 292/113 |
| 4,991,885 A | * | 2/1991 | Poe ............................. 292/113 |
| 5,152,559 A | | 10/1992 | Henrichs ................... 292/113 |
| 5,620,212 A | * | 4/1997 | Bourne et al. .............. 292/113 |
| 5,915,765 A | * | 6/1999 | Sternberger ............ 292/256.69 |
| 5,984,382 A | * | 11/1999 | Bourne et al. .............. 292/113 |
| 6,036,238 A | * | 3/2000 | Lallament ................... 292/100 |
| 6,042,156 A | * | 3/2000 | Jackson ........................ 292/26 |
| 6,279,971 B1 | * | 8/2001 | Dessenberger, Jr. ......... 292/113 |

* cited by examiner

*Primary Examiner*—Anthony Knight
*Assistant Examiner*—Matthew E. Rodgers
(74) *Attorney, Agent, or Firm*—Barnes & Thornburg

(57) ABSTRACT

Disclosed is a cinch-up latch for securing an aircraft panel to a keeper. The cinch-up latch includes a bracket, a handle, a trigger lock, a hook, and a linkage. The handle is moveable between a closed and an open position and includes a handle base plate. The trigger lock is pivotably mounted to the handle so that when the handle is in the closed position, the trigger lock engages the keeper. When the handle is in the open position, the trigger lock is disengaged from the keeper. The hook is rotatably mounted to the handle and is used for engaging the keeper. The linkage is rotatably mounted to the bracket, the handle, and the hook. The linkage has an over-center position which prevents the hook from disengaging the keeper when the handle is in the closed position. The trigger lock engages the linkage when the handle is in the closed position.

19 Claims, 16 Drawing Sheets

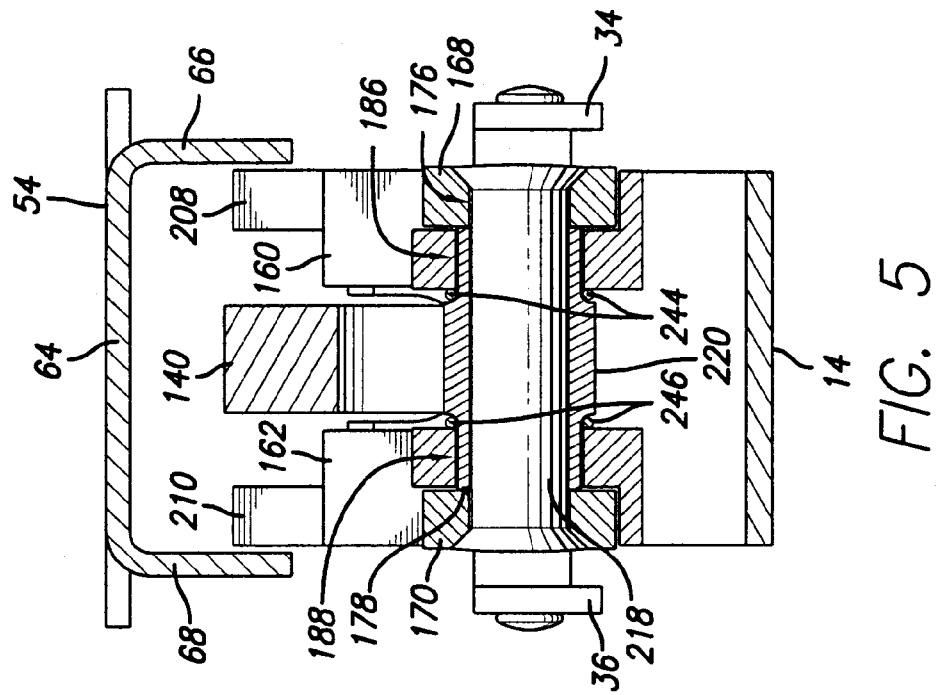

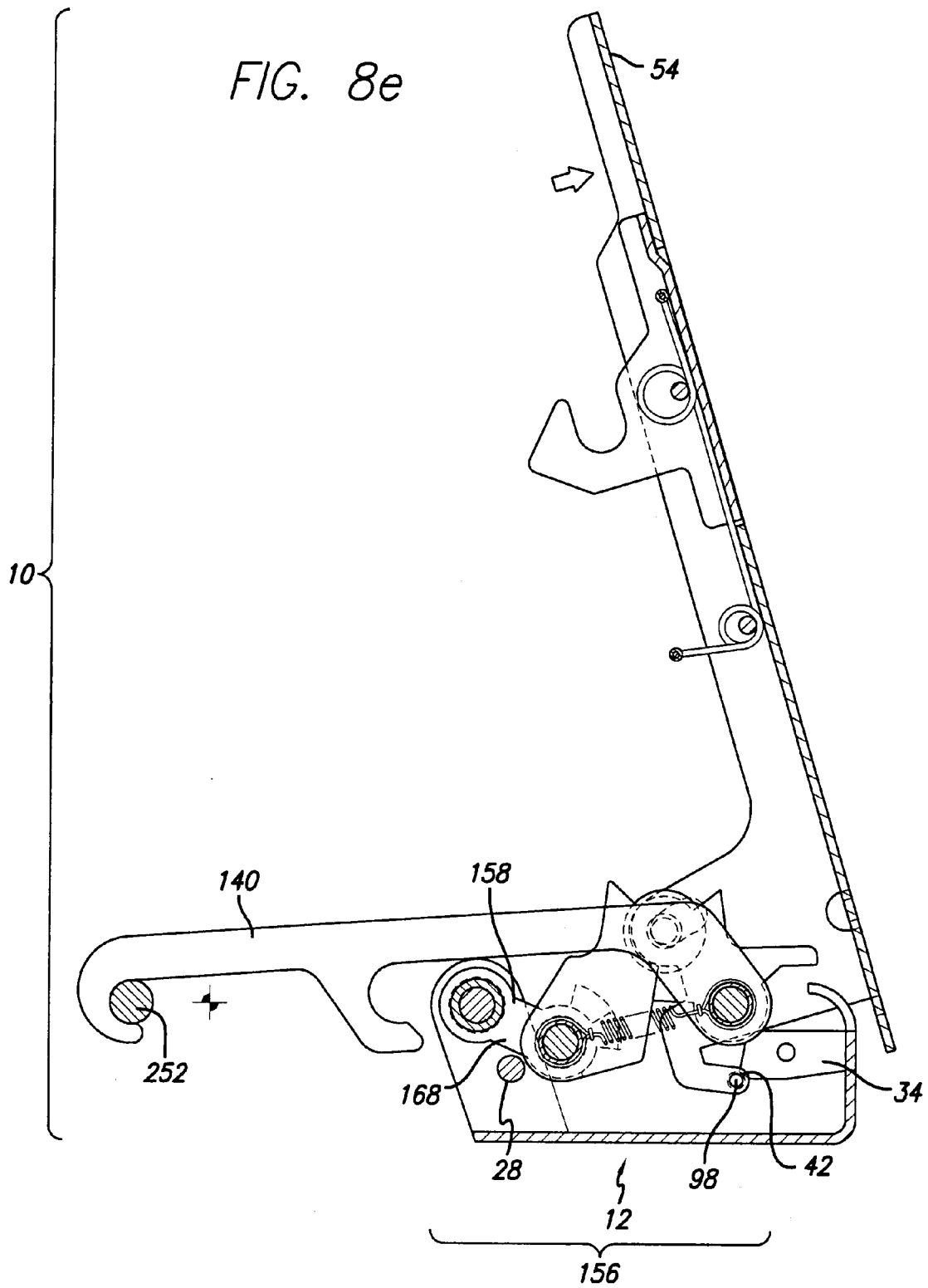

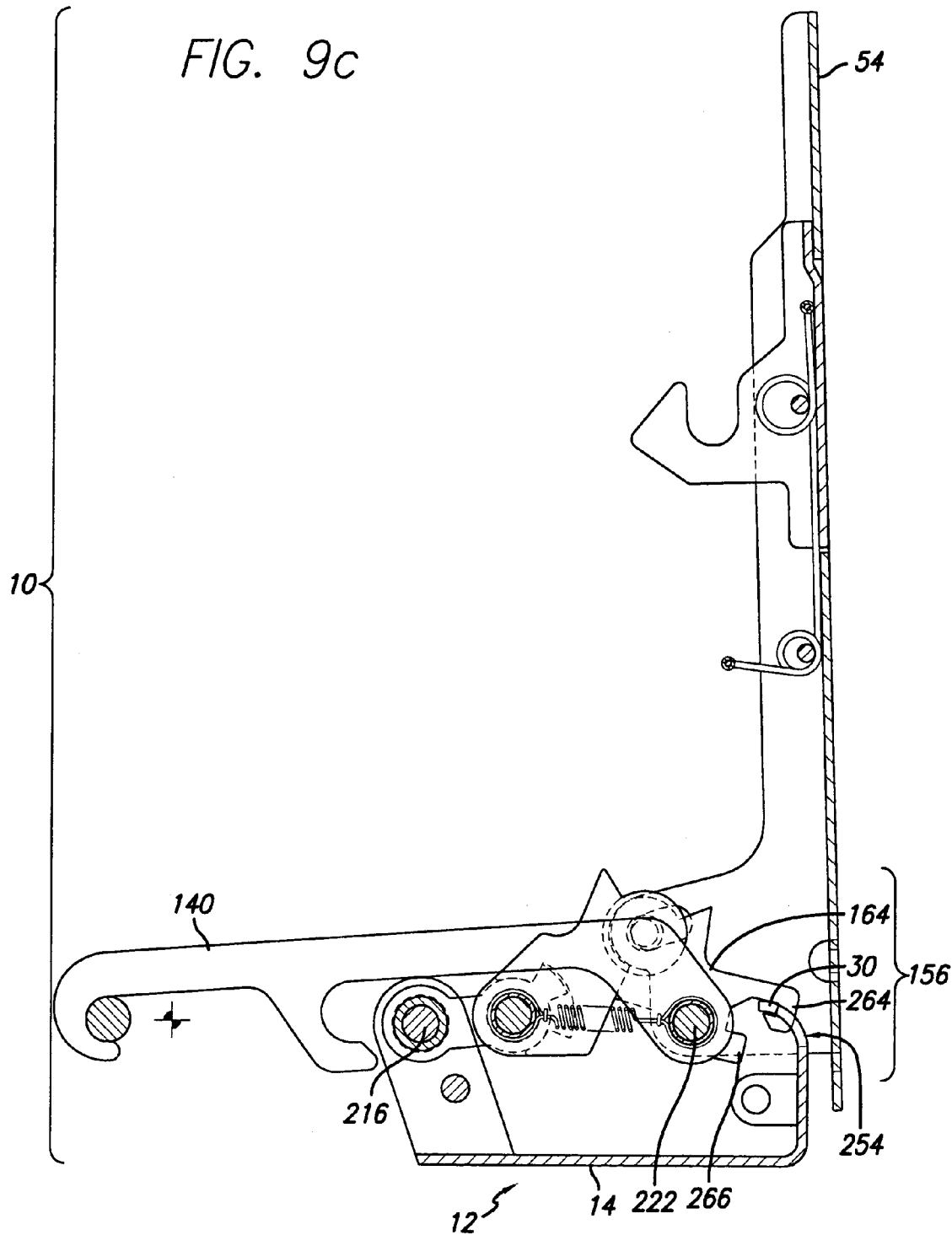

CINCH-UP LATCH

BACKGROUND OF THE INVENTION

1. Field of the Invention

This invention relates to the mechanical arts. In particular, this invention relates to a cinch-up latch for securing two members, typically an aircraft panel and a keeper, to one another.

2. Discussion of the Related Art

Modern jet engines are usually enclosed by a large cylindrical-shaped structure which typically includes a pair of aircraft cowlings. These cowlings must be able to withstand considerable tension hoop loads caused by the high pressure of the jet exhaust stream flowing through the engine. Typically, the cowlings are hinge-mounted to the upper portion of the engine, near where the engine is mounted to the aircraft via an engine pylon. The cowlings are hinged so that they may be pivoted upward to provide access to the engine for maintenance and repair.

Latches are frequently used to secure aircraft cowlings together by holding the cowlings adjacent to one another or adjacent to an interposed strut at their peripheral edges. These latches must be able to secure the cowlings in place by exerting a large amount of force on compressible seals located between the cowlings or the cowlings and the interposed strut. The size and number of the compressible seals have increased in recent years due to increases in the size of jet engines.

Conventional cowling latches have the disadvantage of requiring either more than one worker, to push the cowlings together closing the gap between the cowlings, or the use of an additional tool called a come-along to close the cowlings. Only after the cowlings are pushed together, can the latch, which has a limited reach, be secured. Another method used to secure the cowlings involves the use of a first latch to help close the gap between the cowlings, and then the use of other latches, having less reach, that further secure the cowlings to each other. The operator must secure the first latch before the other latches are secured. One disadvantage associated with this method is that a typical first latch is considerably larger, heavier, and more costly than ordinary latches. Also, in general, the position of the latch is limited to the ends of the cowlings. Often, as a result of the reach requirements, the first latch has reduced load capabilities after the other latches are secured. Thus, the first latch is carried by the aircraft as extra weight.

Therefore, there is a need for a single latch that can provide an extended range of "drawing together" motion for interfacing with a keeper, and be opened and closed by a single latch operator.

In addition, it is desirable to maximize the amount of force that the latch can apply in drawing the cowlings together. Maximizing the amount of force that a single latch can exert also has the added benefit of reducing the number of latches required to secure the cowlings.

However, there are two issues that always need to be addressed in the design of a latch, namely, the dimensional and weight restrictions that are imposed by the aircraft manufacturer. In prior designs, these restrictions severely limited the capabilities of latching devices to apply large forces over the distance required to draw large, modern cowlings together.

In view of the above, it should be appreciated that there is a need for a single latch that can provide an extended range of motion for interfacing with a keeper, that can be opened and closed by a single latch operator, that need not be opened or closed in a particular sequence with other latches, that can provide a large amount of force for drawing aircraft cowlings together, that closely approximate the dimensions and weight of an ordinary latch used to secure aircraft cowlings, and that can be operated in a manner similar to ordinary latches. The present invention satisfies these and other needs and provides further related advantages.

SUMMARY OF THE INVENTION

The invention resides in a cinch-up latch that provides advantages over known latches in that the cinch-up latch provides an extended range of motion for interfacing with a keeper, the cinch-up latch can be opened and closed by a single latch operator, the cinch-up latch need not be opened or closed in a particular sequence with other latches, the cinch-up latch provides a large amount of force for drawing aircraft cowlings together, the cinch-up latch closely approximates the dimensions and weight of an ordinary latch used to secure aircraft cowlings, and the cinch-up latch can be operated in a manner similar to ordinary latches.

Preferred embodiments of the cinch-up latch include a bracket, a handle, a trigger lock, a hook, and a linkage. The handle is moveable between a closed and an open position and includes a handle base plate. The trigger lock is pivotably mounted to the handle. The trigger lock engages a keeper when the handle is in the closed position and the trigger lock is disengaged from the keeper when the handle is in an open position. The hook is rotatably mounted to the handle and is used for engaging the keeper. The linkage is rotatably mounted to the bracket, the handle, and the hook. The linkage has an over-center position which prevents the hook from disengaging the keeper. The trigger lock engages the linkage when the handle is in the closed position.

In an alternative embodiment of the present invention, the cinch-up latch includes a trigger spring assembly which interfaces with the handle and the trigger lock. The trigger spring assembly urges the handle toward an open position and the trigger lock toward a position flush with the handle base plate. The hook has a curved end used for engagement with the keeper and an opposing base end which is rotatably mounted to the handle. Also, the hook has a central body located between the curved end and the base end of the hook. Furthermore, a safety curved end is located on the central body of the hook. The linkage of the cinch-up latch is rotatably mounted to the base end of the hook in addition to the bracket and the handle. The safety curved end of the hook engages the linkage when the linkage is in its over-center position.

In another embodiment of the present invention, the bracket includes a pair of mounting ears, having camming surfaces. Also, the handle includes a pair of curved channels, and a pair of rounded ends which contact the pair of mounting ears and ride against the camming surfaces when the handle moves between the closed position and an open position. The linkage also includes a pair of common link interface pins positioned within the pair of curved channels in the handle.

Embodiments of the present invention include a linkage having an elongated link, a pair of connecting links, and a pair of common links. One end of the elongated link is rotatably mounted to the bracket while the opposing end of the elongated link is rotatably connected to one end of the pair of connecting links. The opposing end of the pair of connecting links is rotatably connected to one end of the pair of common links. The opposing end of the pair of common links is rotatably mounted to the handle and the hook.

Another alternative embodiment of the present invention includes a bracket with a curved lip having a pair of bracket notches. The linkage of this embodiment includes a pair of common link curved ends and a pair of common link extensions. The each bracket notch may receive either a common link curved end or a common link extension, thereby, securing the linkage to the bracket.

In another alternative embodiment of the present invention, the bracket has a pair of mounting tabs instead of a pair of mounting ears with camming surfaces. Also, the handle does not include a pair of rounded ends. Thus, in this embodiment, the handle is not designed to make contact with the mounting tabs.

A feature of the invention is that it provides an extended range of motion for interfacing with a keeper, as much as six times the range of motion of ordinary cowling latches. In addition, the dimensions and weight of the cinch-up latch are designed to fall well within the envelope and weight restrictions of an ordinary cowling latch.

Another feature of the linkage of the present invention is that during the initial opening and prior to closing the latch, the linkage maintains the position of the hook such that the hook remains aligned with the direction of the tension load. Also, the linkage allows for the aircraft panel to remain partially open while the hook remains secured to the keeper. This is advantageous since the linkage prevents the handle from being yanked away from the operator's hand as often occurs when a latch is released over the entire span of the latch.

A further advantage of the present invention is that the hook has a redundant safety curved end which helps to prevent the hook from unlatching when the cinch-up latch is closed. The safety curved end holds the hook securely to the linkage at the point where the linkage is rotatably mounted to the bracket. Also, the linkage of the present invention advantageously allows for hook movement along the direction of the load carried by the hook when the redundant safety curved end engages the linkage.

Other features and advantages of the present invention will be set forth, in part, in the description which follows and the accompanying drawings, wherein the preferred embodiments of the present invention are described and shown, and in part will become apparent to those skilled in the art upon examination of the following detailed description taken in conjunction with the accompanying drawings, or may be learned by practice of the present invention. The advantages of the present invention may be realized and attained by means of the instrumentalities and combinations particularly pointed out in the appended claims.

BRIEF DESCRIPTION OF THE DRAWINGS

FIG. 4 is a sectional view of a linkage, illustrating the interface of a bracket with an elongated link.

FIG. 5 is a sectional view of a linkage, illustrating the interface of an elongated link and a connecting link.

FIG. 8e is a sectional view of a cinch-up latch with a rounded end of the handle in contact with downward camming surface of a mounting ear.

FIG. 9c is a sectional view of a second embodiment of a cinch-up latch with a common link curved end inserted into a bracket notch.

FIG. 10 is a top plan view of a bracket of a second embodiment of the cinch-up latch of FIG. 9a.

FIG. 11 is a side elevational view of a bracket of a second embodiment of the cinch-up latch of FIG. 9a.

FIG. 12 is a side elevational view of a common link from a second embodiment of the cinch latch of FIG. 9a.

DESCRIPTION OF THE PREFERRED EMBODIMENTS

Figure 1:
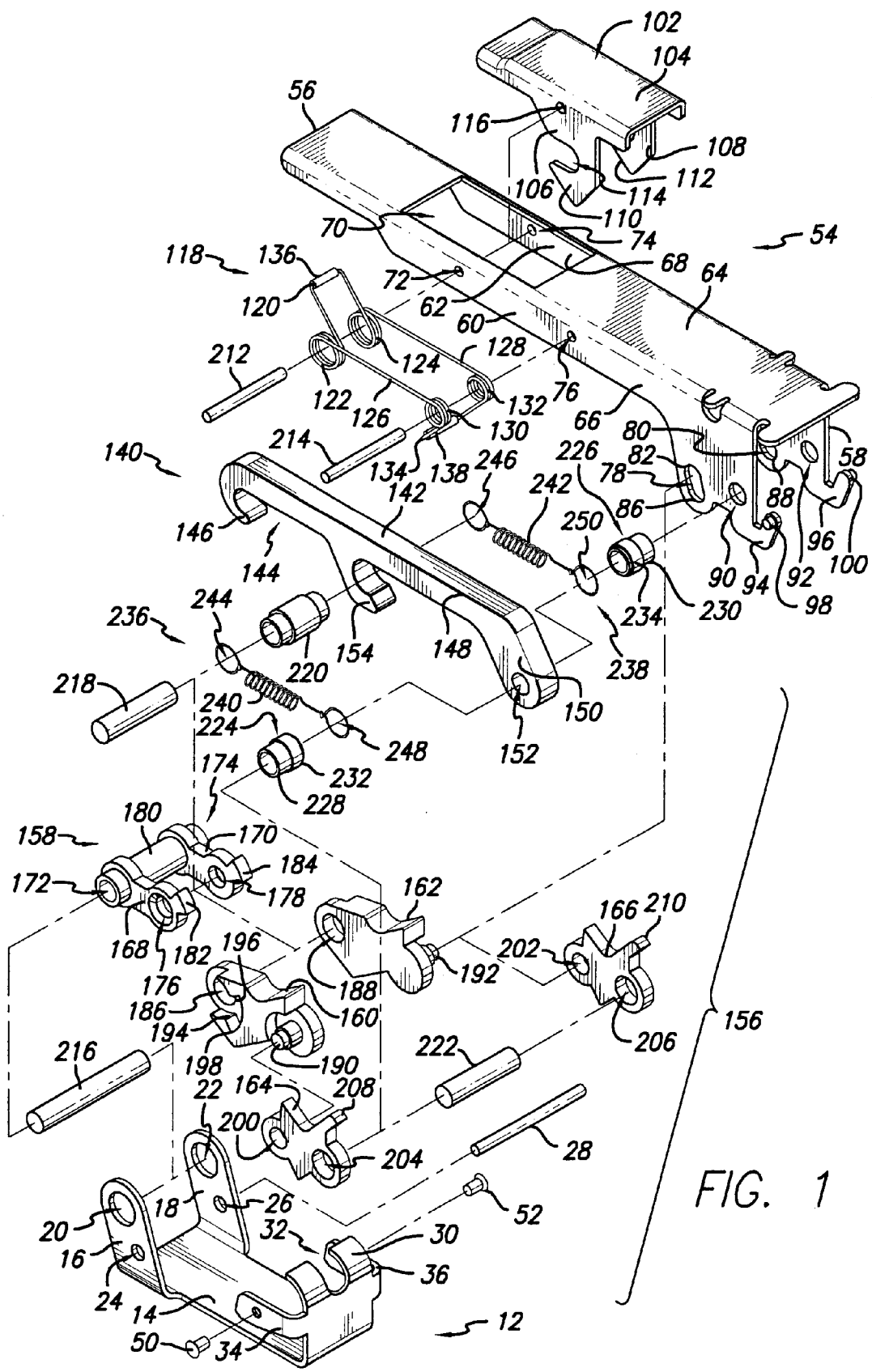
FIG. 1 is an exploded view of a cinch-up latch in accordance with the invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The invention is embodied in a cinch-up latch for securing two members, typically an aircraft panel and a keeper, to one another. As shown in the exemplary drawings, with particular reference to FIGS. 1 and 2, the cinch-up latch 10 includes a bracket 12 having a rectangular base plate 14 and a pair of bracket extensions 16 and 18 vertically positioned above one end of the rectangular base plate. The bracket extensions are parallel to each other and spaced apart by the rectangular base plate. Each bracket extension has formed therethrough an aligned linkage pin hole 20 and 22, respectively, near the end of the bracket extension furthest from the rectangular base plate. Also, each bracket extension has formed therethrough an aligned stopping pin hole 24 and 26, respectively, located between the linkage pin hole and the rectangular base plate. A stopping pin 28 is inserted through both stopping pin holes.

The bracket 12 includes a curved lip 30, having a central notch 32, connected to the end of the rectangular base plate 14 furthest from the bracket extensions 16 and 18. As best seen in FIG. 2, the bracket includes a pair of mounting ears 34 and 36 (one shown), positioned between the rectangular base plate and the end of the curved lip not attached to the rectangular base plate. Each mounting ear respectively includes a mounting ear top surface 38 (one shown), a mounting ear front surface 40 (one shown), a downward camming surface 42 (one shown), a mounting ear bottom surface 44 (one shown), and an upward camming surface 46 (one shown). The downward camming surface is adjacent to the bottom surface of each mounting ear, and faces toward the rectangular base plate and the respective bracket extension. The upward camming surface is located adjacent to the bottom surface of each mounting ear, and faces toward the rectangular base plate and away from the bracket extension. Each mounting ear has formed therethrough aligned mounting ear holes 48 (one shown), respectively, for receipt of fasteners 50 and 52 (see FIG. 1), respectively, to mount the bracket to the aircraft panel (not shown).

Returning to FIG. 1, the cinch-up latch 10 also includes a handle 54 which has a handle front end 56, a handle back end 58, an exterior surface 60, and an interior surface 62. The handle has a generally U-shaped cross section formed by a handle base plate 64 and a pair of depending handle flanges 66 and 68 that are spaced apart by the handle base plate and are aligned parallel to each other. The handle base plate has a rectangular slot 70 formed therethrough.

Each handle flange 66 and 68 has formed therethrough an aligned trigger lock mounting hole 72 and 74, respectively, positioned adjacent to the rectangular slot 70. Also, each handle flange has formed therethrough an aligned trigger spring mounting hole 76 (one shown), respectively, between the trigger lock mounting hole and the handle back end 58. In addition, each handle flange has formed therethrough a curved channel 78 and 80, respectively, each curved channel having a curved channel first end 82 and 84 (one shown), respectively, and a curved channel second end 86 and 88, respectively. Each handle flange also has an aligned handle mounting hole 90 and 92, respectively, adjacent to the handle back end.

Each handle flange 66 and 68 has an arm 94 and 96, respectively, extending from the handle back end 58 adjacent to the handle mounting hole 90 and 92, respectively. Each arm has a rounded end 98 and 100, respectively, positioned on the end of the arm furthest from the handle mounting hole. Each rounded end extends perpendicularly outward from the exterior surface 60 of the handle 54.

The cinch-up latch 10 includes a trigger lock 102 used to open and close the handle 54. The trigger lock is generally U-shaped in cross section, formed by a trigger lock base plate 104, conforming to the shape of the rectangular slot 70, and a pair of depending trigger lock flanges 106 and 108. The trigger lock flanges are positioned parallel to each other and are spaced apart by the trigger lock base plate. The trigger lock flanges terminate in curved forward ends 110 and 112, respectively. The curved forward ends define trigger lock slots 114 (one shown), respectively. Each trigger lock flange has formed therethrough an aligned trigger lock hole 116 (one shown), respectively.

The cinch-up latch 10 includes a trigger spring assembly 18 interfacing with the handle 54 and the trigger lock 102.

The trigger spring assembly urges the handle to an open position and the trigger lock toward a position flush relative to the handle base plate 64. The trigger spring assembly is comprised of a U-shaped trigger lock end 120, a pair of trigger lock coils 122 and 124, a pair of connecting wires 126 and 128, a pair of handle coils 130 and 132, and a U-shaped hook interface end 134. The U-shaped trigger lock end is adjacent to the pair of trigger lock coils, and the U-shaped hook interface end is adjacent to the pair of handle coils. The pair of connecting wires links the pair of trigger lock coils to the pair of handle coils. Cylinders 136 and 138 are located at the U-shaped trigger lock end and the U-shaped hook interface end, respectively.

The cinch-up latch 10 includes a hook 140, with a hook top surface 142 and a hook bottom surface 144, that is rotatably mounted to the handle 54. The hook has a curved end 146, a bar-shaped central body 148, and a base end 150. The base end has formed therethrough a base hole 152. A safety curved end 154 connects to the hook bottom surface approximately halfway along the length of the central body of the hook.

A linkage 156 rotatably mounts to the bracket 12, the handle 54 and the hook 140. The linkage includes an elongated link 158, a pair of connecting links 160 and 162, and a pair of common links 164 and 166. The elongated link includes two barbell-shaped sides 168 and 170, with each barbell-shaped side having formed therethrough an aligned bracket hole 172 and 174, respectively, at one end, and an aligned connecting link hole 176 and 178, respectively, at the other end. The two barbell-shaped sides are held parallel to each other by an elongated link tube 180 which extends through the bracket hole in each barbell-shaped side. An elongated link finger 182 and 184, respectively, extends from the end of each barbell-shaped side adjacent to the connecting link hole.

Each connecting link 160 and 162 has formed therethrough an elongated link hole 186 and 188, respectively, at one end, and a common link interface pin 190 and 192, respectively, at the other end. Each connecting link includes a notch 194 (one shown), respectively, adjacent to the elongated link hole. Each notch has a notch first end 196 (one shown) and a notch second end 198 (one shown), respectively. Each common link 164 and 166 has formed therethrough an interface pin hole 200 and 202, respectively, at one end, and a common link mounting hole 204 and 206, respectively, at the other end. A common link finger 208 and 210, respectively, is positioned adjacent to, and above, the common link mounting hole.

Figure 3:
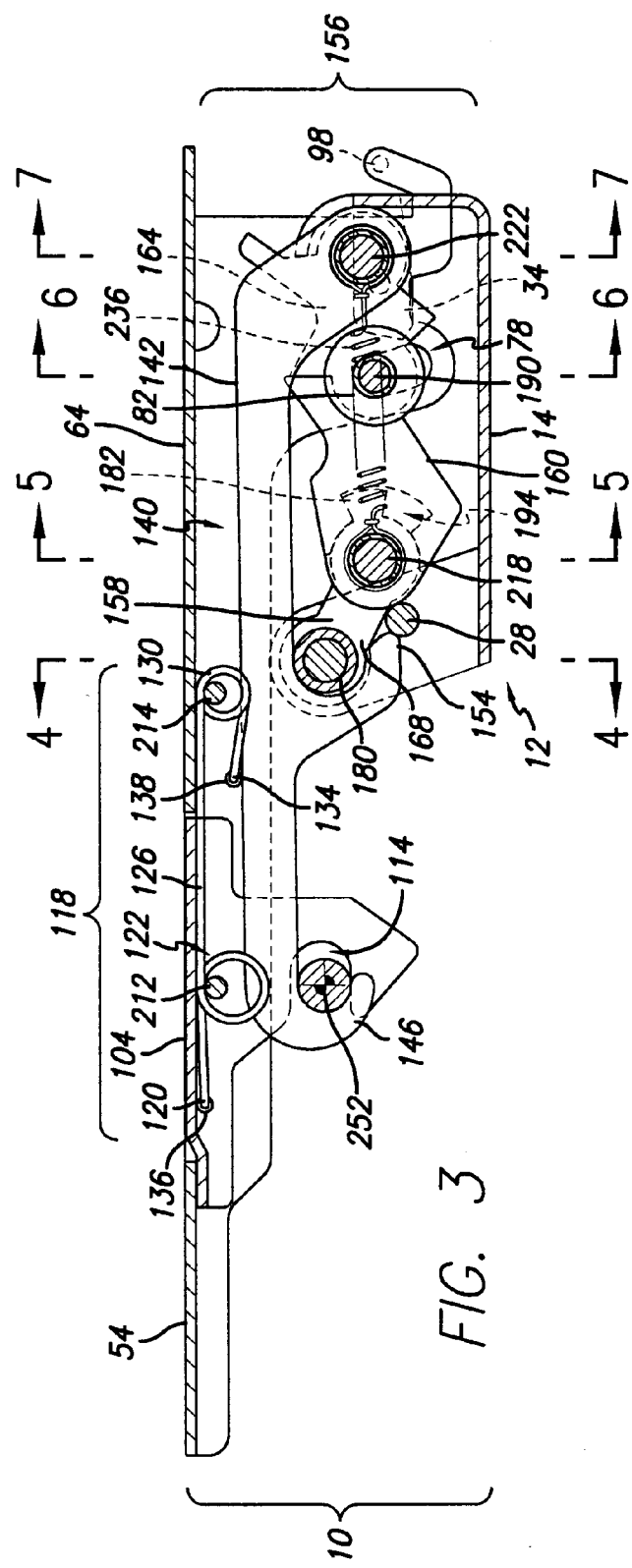
FIG. 3 is a sectional view of a cinch-up latch, illustrating the cinch-up latch in the closed position.

The trigger lock 102 is pivotably mounted to the handle 54 by means of a trigger lock pin 212 that inserts through each trigger lock mounting hole 72 and 74 of the handle, each trigger lock hole 116 (one shown) of the trigger lock, and the pair of trigger lock coils 122 and 124. A trigger spring mounting pin 214 inserts through each trigger spring mounting hole 76 (one shown) of the handle and the pair of handle coils 130 and 132. Referring additionally to FIG. 3, the U-shaped trigger lock end 120 of the trigger spring assembly 118 is positioned against the trigger lock base plate 104 and biases the trigger lock toward a position flush with the handle base plate 64. The cylinder 136 located at the U-shaped trigger lock end rolls against the trigger lock base plate and prevents wear on the U-shaped trigger lock end and the trigger lock base plate.

Referring to FIG. 4, a bracket pin 216 is inserted through the elongated link tube 180 and the linkage pin hole 20 and 22 of each bracket extension 16 and 18, respectively. The elongated link 158 is connected to the bracket 12 such that the elongated link is allowed to rotate about the axis of the bracket pin. FIG. 5 shows the elongated link rotatably connected to the pair of connecting links 160 and 162 by means of a connecting link pin 218 which inserts through both of the connecting link holes 176 and 178 of the elongated link, both of the elongated link holes 186 and 188 of the connecting links, and a connecting link tube 220. As shown in FIG. 3, the elongated link fingers 182 and 184 (one shown) are positioned so as to interface the notch 194 (one shown) of each connecting link (one shown).

Figure 7:
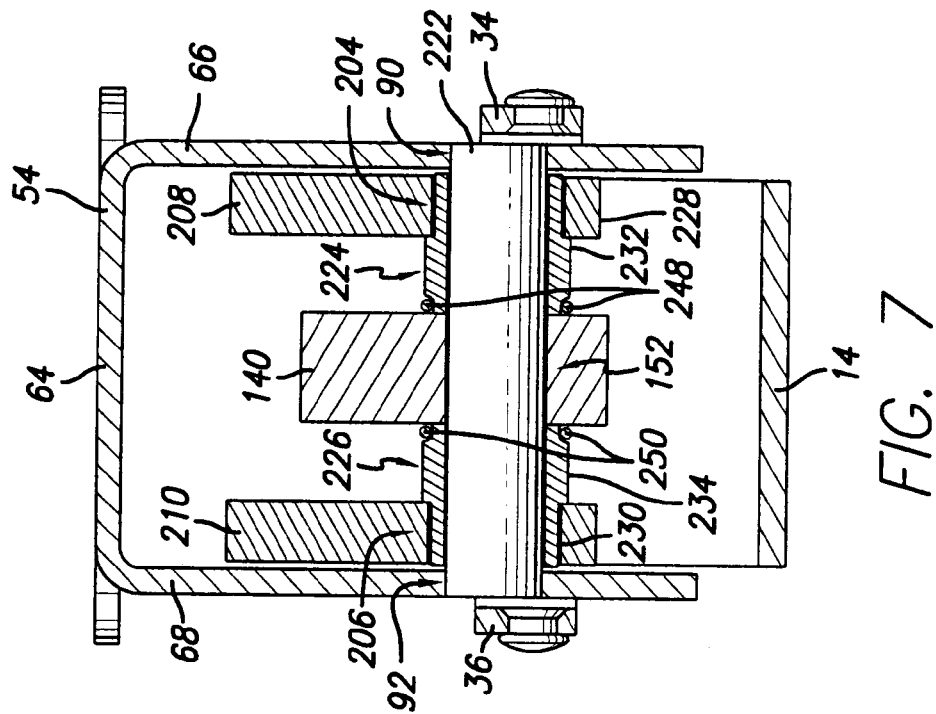
FIG. 7 is a sectional view of a linkage, illustrating the interface of a common link, a hook, and a handle.
Figure 6:
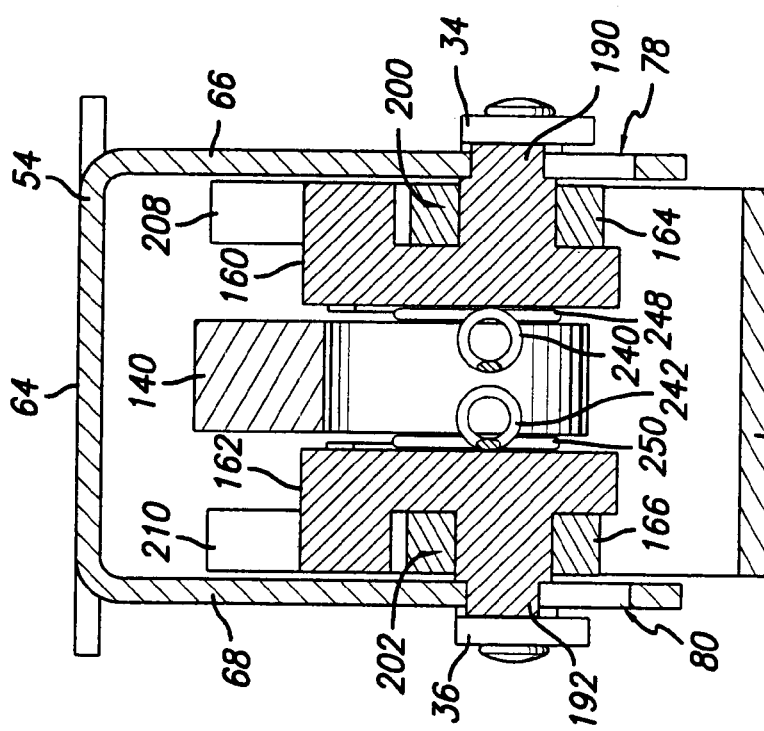
FIG. 6 is a sectional view of a linkage, illustrating the interface of a connecting link and a common link.

FIG. 6 shows the common link interface pin 190 and 192 of each connecting link 160 and 162, respectively, inserted into an interface pin hole 200 and 202 of each common link 164 and 166, respectively. Thus, each connecting link is rotatably connected to a common link. Also, each common link interface pin is positioned so as to reside within a curved channel 78 and 80, respectively, in the handle 54. As shown in FIG. 7, a common pin 222 rotatably mounts the handle and the hook 140 to the linkage 156 by inserting through both of the handle mounting holes 90 and 92, the common link mounting hole 204 and 206, respectively, of both common links, the base hole 152 of the hook, and a pair of common link collars 224 and 226. Each common link collar has a narrow end 228 and 230, respectively, and a wide end 232 and 234, respectively. The narrow end of each common link collar inserts into one of the common link mounting holes.

Figure 2:
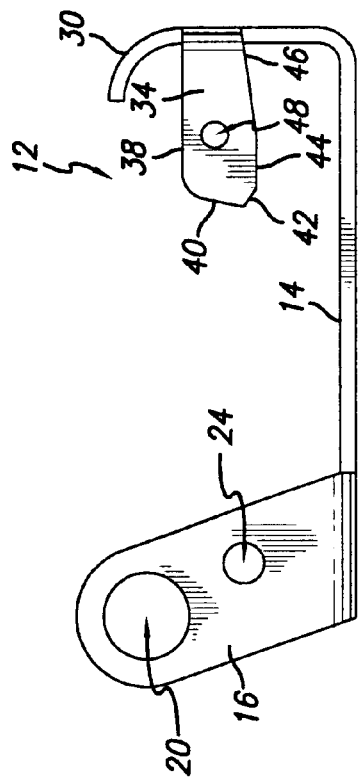
FIG. 2 is a side elevational view of a bracket shown in the cinch-up latch of FIG. 1.

FIG. 1 shows a pair of springs 236 and 238, each spring connecting between the connecting link tube 220 and a common link collar 224 and 226. Each spring respectively includes a coil 240 and 242, a tube loop 244 and 246 at one end, and a collar loop 248 and 250 at the other end. The connecting link tube inserts through each tube loop such that a tube loop is adjacent to each elongated link hole 186 and 188 in the connecting link 160 and 162, respectively, as shown in FIG. 5. The collar loop of each spring slips over the edge of the common link collar closest to the hook 140, as shown in FIG. 7.

The method of use and operation of the cinch-up latch 10, constructed as described above, proceeds as follows. It shall be appreciated that FIGS. 3, 8a, 8b, 8c, 8d, 8e, 8f, 8g, and 8h illustrate the operation of the cinch-up latch and are sectional views, and therefore, the description of operation as to the illustrated sectional view applies to the other corresponding half of the cinch-up latch.

With particular reference to FIG. 3, when the cinch-up latch 10 is properly closed, the handle 54 is in its closed position with the handle base plate 64 relatively parallel to the hook top surface 142 and the rectangular base plate 14 of the bracket 12. In the closed position, the curved end 146 of the hook 140 and the trigger lock slot 114 engage a keeper 252. The U-shaped hook interface end 134 of the trigger spring assembly 118 rests against the hook top surface. The safety curved end 154, which helps to resist forces that would tend to rotate the hook relative to the common pin 222, is engaged to the elongated link tube 180 of the linkage 156.

When the cinch-up latch 10 is properly closed, the linkage 156 is in its over-center position which prevents the hook 140 from disengaging from the keeper 252. In the over-center position, the elongated link 158 rests against the stopping pin 28 of the bracket 12 and the elongated link finger 182 is positioned at the notch first end 196 of the connecting link 160. The connecting link and the common link 164 are positioned such that the axis of the common link interface pin 190 is positioned below the plane formed by the axis of the connecting link pin 218 and the common pin 222. The over-center position of the connecting link and the common link is held in place by the pair of springs 236 and 238 (one shown). The common link interface pin is adjacent to the curved channel first end 82 when the handle 54 is in the closed position. Also, the rounded end 98 of the handle is not in contact with the mounting ear 34.

Figure 8A:
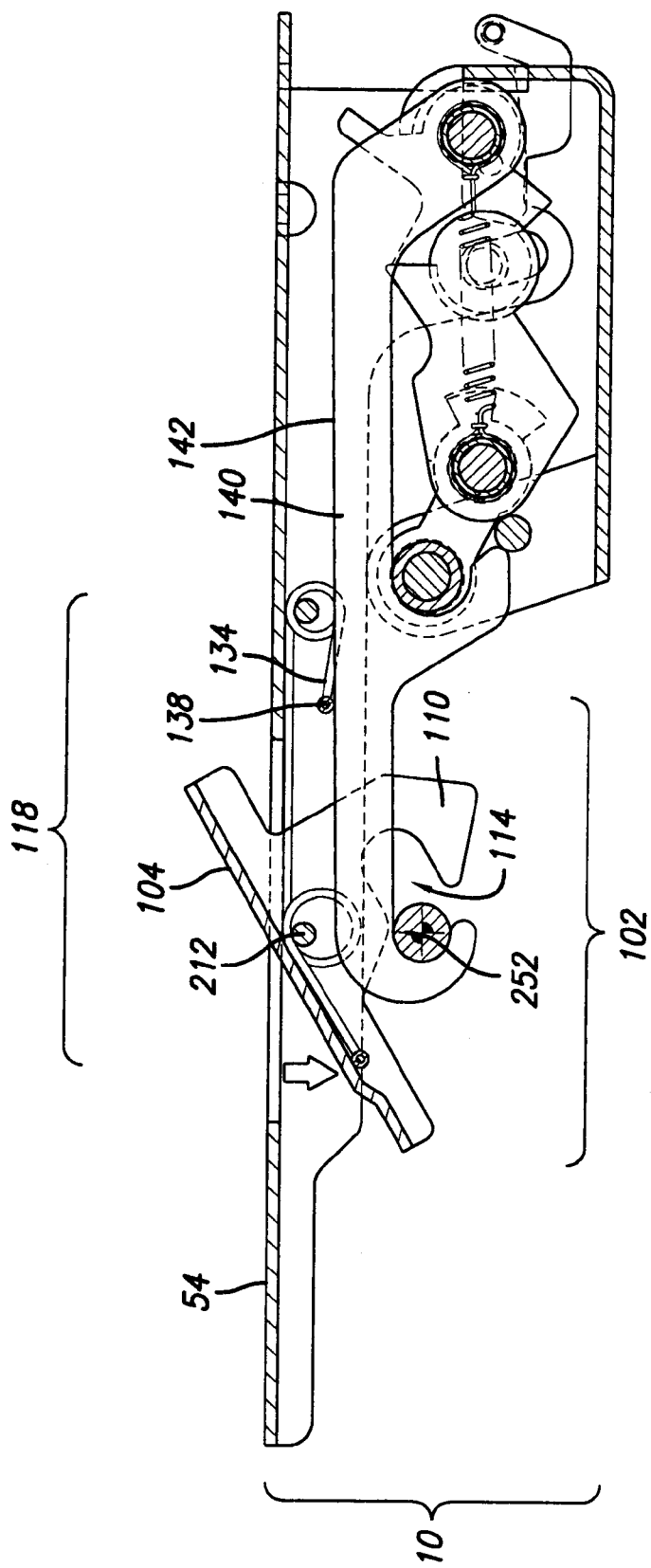
FIG. 8a is a sectional view of a cinch-up latch in the closed position with a depressed trigger lock.

The initial step performed toward opening the cinch-up latch 10 is shown in FIG. 8a where a force has been applied to the trigger lock base plate 104 causing the trigger lock 102 to rotate about the trigger lock pin 212. The rotation of the trigger lock disengages the trigger lock slot 114 from the keeper 252. The U-shaped hook interface end 134 of the trigger spring assembly 118 applies a slight upward force against the hook top surface 142 causing the handle 54 to lift upward toward an open position. As the handle lifts upward, the cylinder 138 located at the U-shaped hook interface end rolls against the hook top surface, thus, reducing wear between the U-shaped hook interface end and the hook top surface. If the cinch-up latch were to be closed, the curved forward end 110 of the trigger lock would ride against the keeper causing the trigger lock to rotate counterclockwise about the trigger lock pin until, with continued downward force, the trigger lock slot engages the keeper.

Figure 8B:
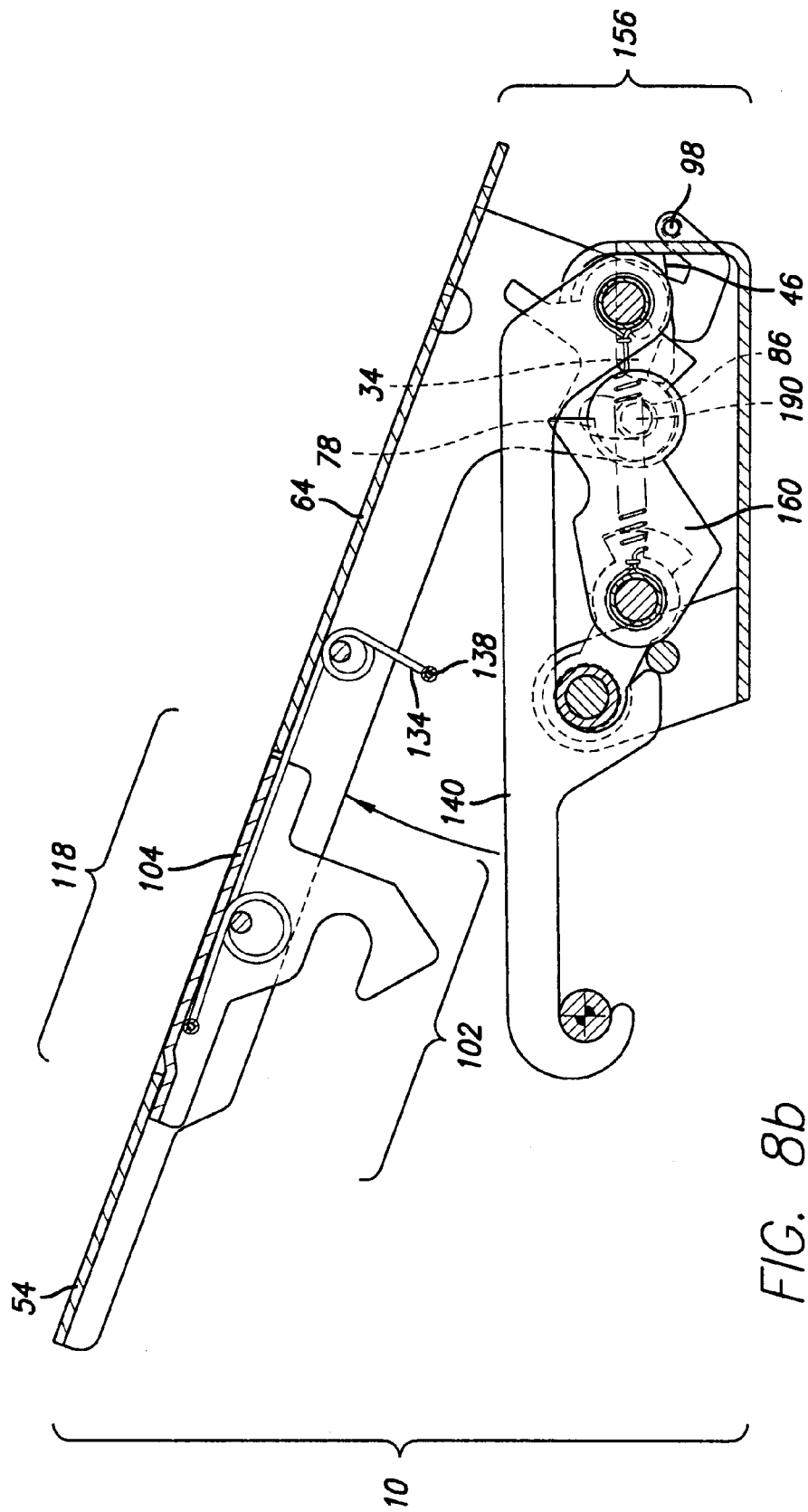
FIG. 8b is a sectional view of a cinch-up latch with a linkage in the over-center position.

FIG. 8b shows the cinch-up latch 10 as the handle 54 is initially pulled upward. The force applied by the trigger spring assembly 118 on the trigger lock base plate 104 has caused the trigger lock 102 to rotate such that the trigger lock base plate is flush with the handle base plate 64. The U-shaped hook interface end 134 and the cylinder 138 of the trigger spring assembly extend perpendicularly below the handle base plate. Also, the common link interface pin 190 is adjacent to the curved channel second end 86. The rotation of the handle has resulted in the rounded end 98 of the handle contacting the upward camming surface 46 of the mounting ear 34. The linkage 156 remains in its over-center position.

Figure 8C:
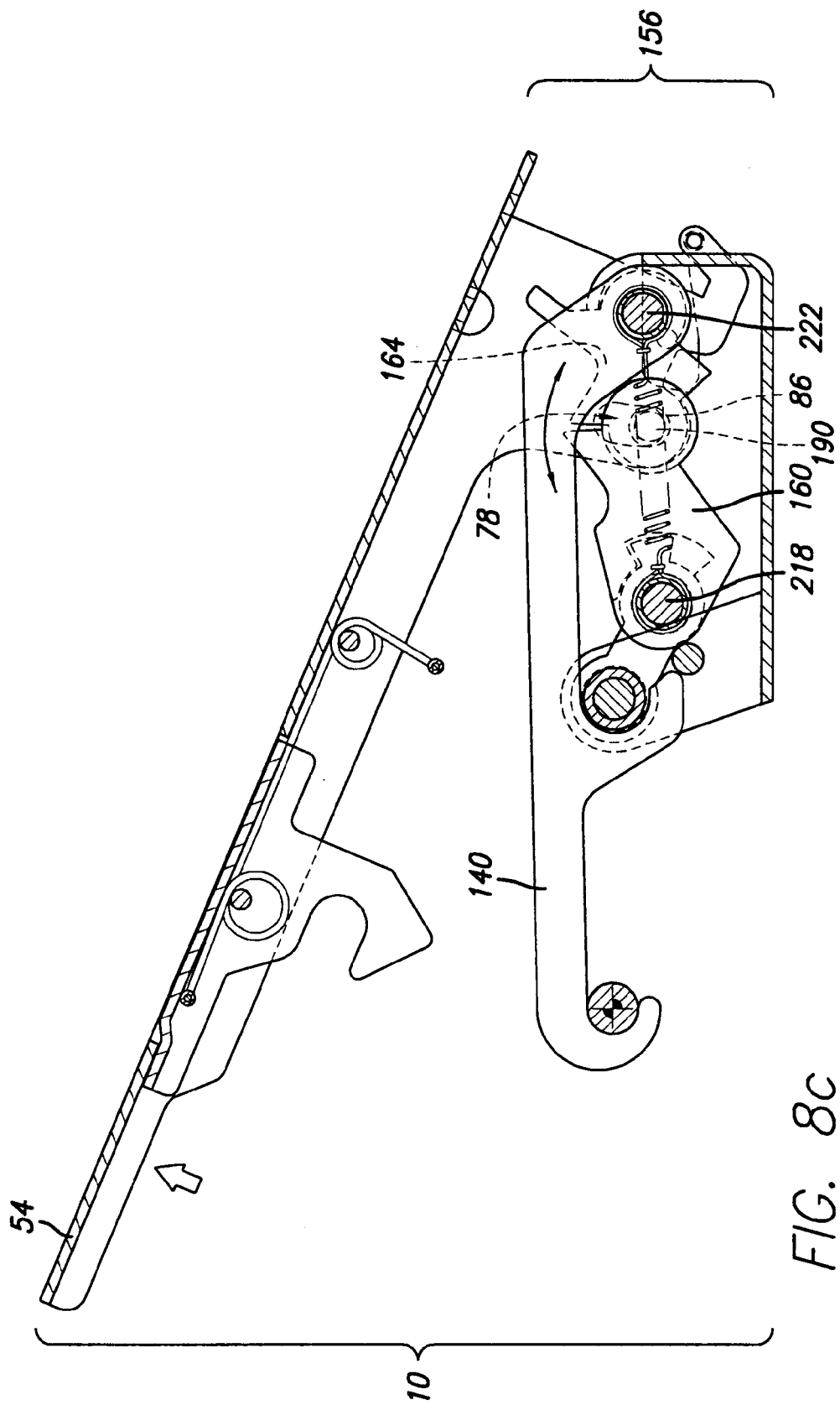
FIG. 8c is a sectional view of a cinch-up latch with a linkage no longer in the over-center position.

As the handle 54 is rotated upward into an open position, the linkage 156 shifts out of the over-center position as shown in FIG. 8c. The over-center position is broken by the curved channel second end 86 making contact with the common link interface pin 190 and pulling the axis of the common link interface pin above the plane formed by the axis of the connecting link pin 218 and the common pin 222. As the common link interface pin moves upward, the common link 164 rotates clockwise relative to the common pin and the plane of the page.

Figure 8D:
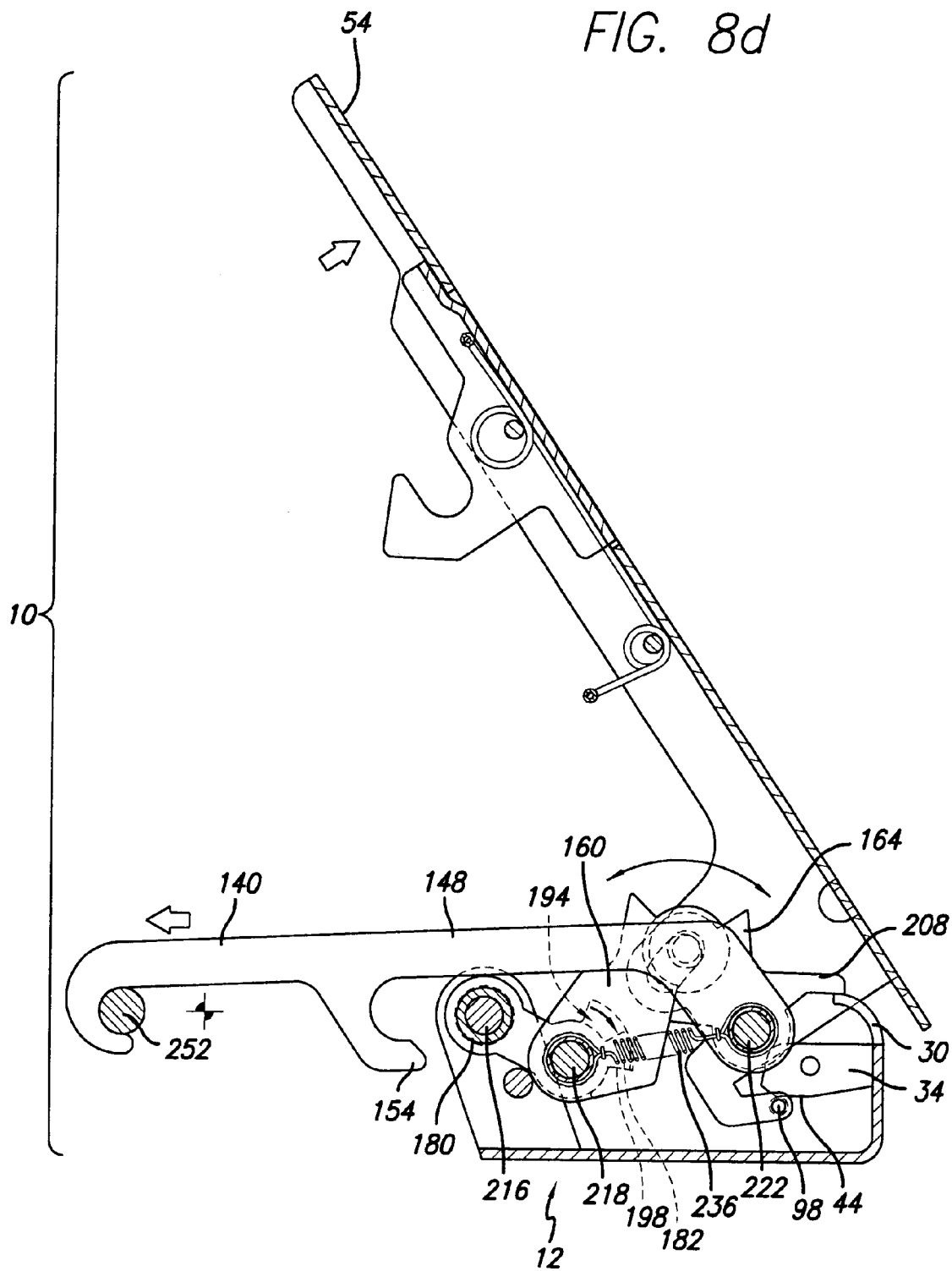
FIG. 8d is a sectional view of a cinch-up latch with a rounded end of the handle in contact with a bottom surface of a mounting ear.

FIG. 8d shows the handle 54 rotated such that the rounded end 98 of the handle is in contact with the mounting ear bottom surface 44. The safety curved end 154 is no longer in contact with the elongated link tube 180 because the hook 140 has shifted laterally due to the pair of springs 236 and 238 (one shown) pulling the common pin 222 toward the connecting link pin 218. The pair of springs holds the hook in this position after release of the tension load. The lateral movement of the hook has reduced the tension applied by the hook on the keeper 252. The elongated link finger 182 is now in contact with the notch second end 198 due to the counterclockwise rotation of the connecting link 160 relative to the connecting link pin and the plane of the page. Also, the common link 164 has rotated such that the common link finger 208 is in contact with the curved lip 30 of the bracket 12.

FIG. 8e shows the handle 54 in a near-vertical open position. The linkage 156 is positioned so as to provide resistance against tension loads on the keeper 252. This position is advantageous in that it allows the aircraft panel (not shown) to be partially open while the hook 140 remains secured to the keeper. This position also provides a safety feature for the operator of the cinch-up latch 10 since the handle is prevented from being yanked from the operator's hand as is often the case when a large tension load is released over the entire span of a latch with an extended range of reach.

Figure 8F:
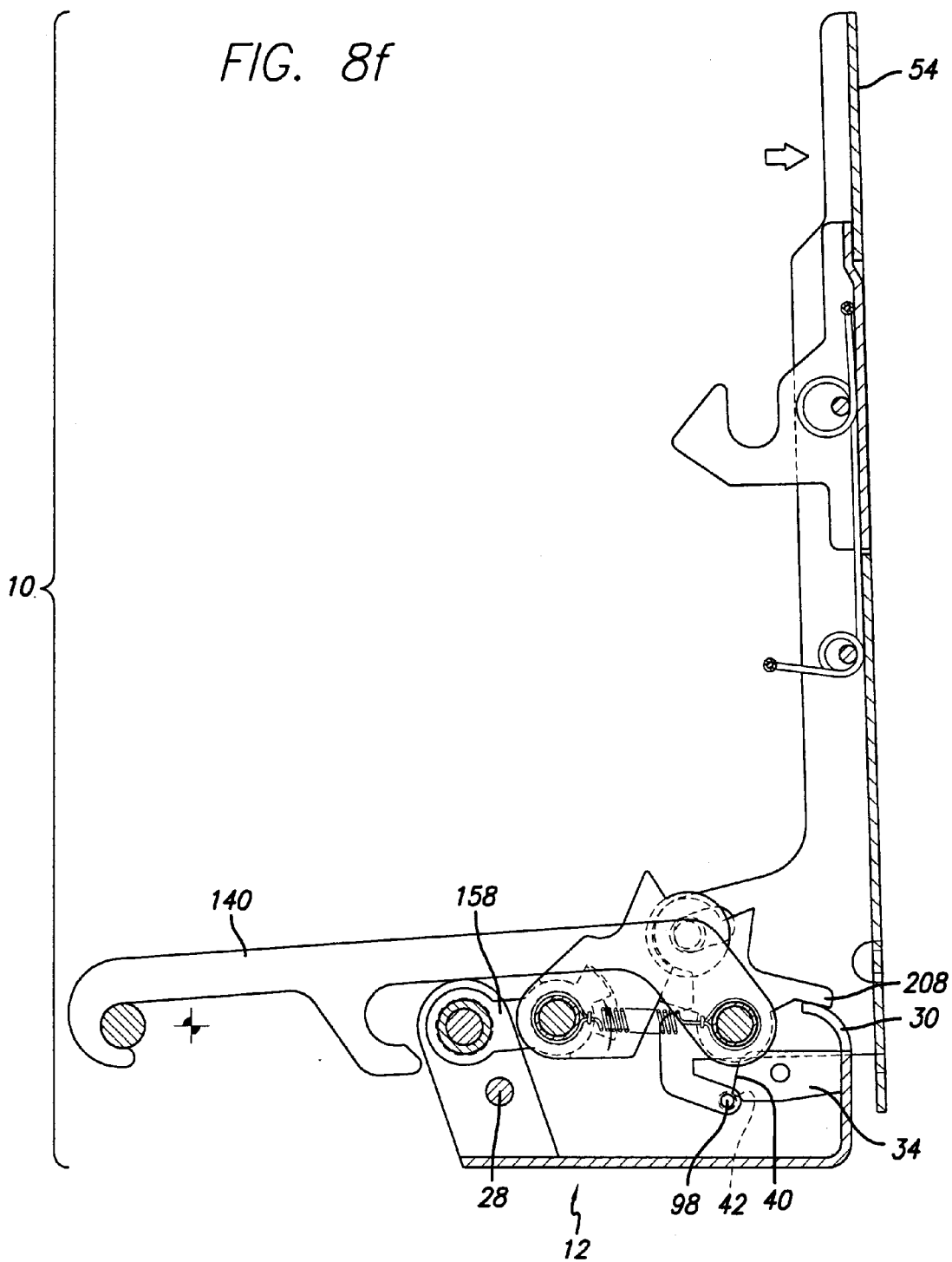
FIG. 8f is a sectional view of a cinch-up latch with a handle in an open position.

The rounded end 98 of the handle 54 is now in contact with the downward camming surface 42 of the mounting ear 34. If the cinch-up latch 10 was being closed, the downward camming surface would assist the operator by transferring the rotational force applied to the handle into a slight downward force that assists the operator with closing the cinch-up latch. Referring to FIG. 8f, when the handle is vertical, the elongated link 158 is rotated still further away from the stopping pin 28. The rounded end of the handle contacts the mounting ear where the mounting ear front surface 40 and the downward camming surface meet.

Figure 8G:
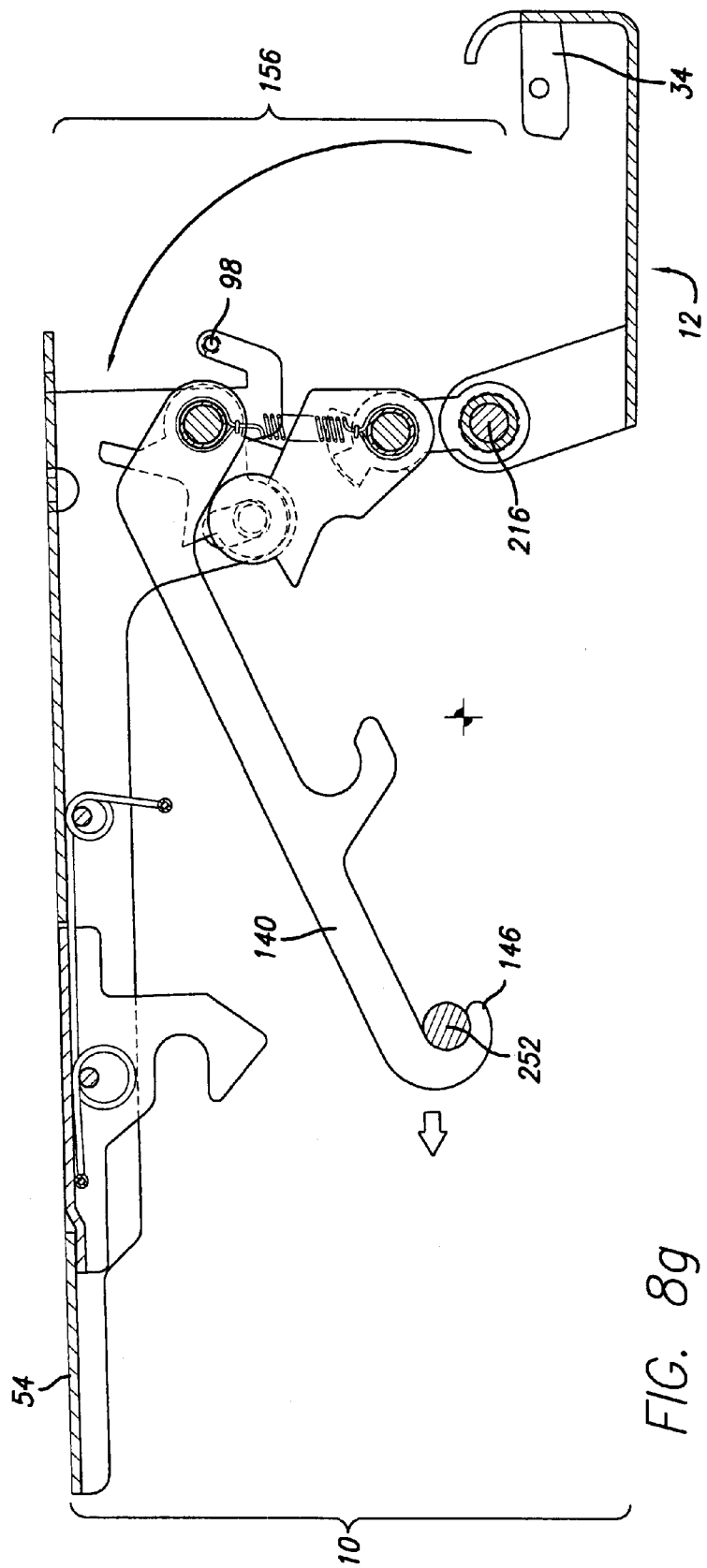
FIG. 8g is a sectional view of a cinch-up latch with a linkage, hook, and handle in an extended-reach position with the hook still engaged to a keeper.
Figure 8H:
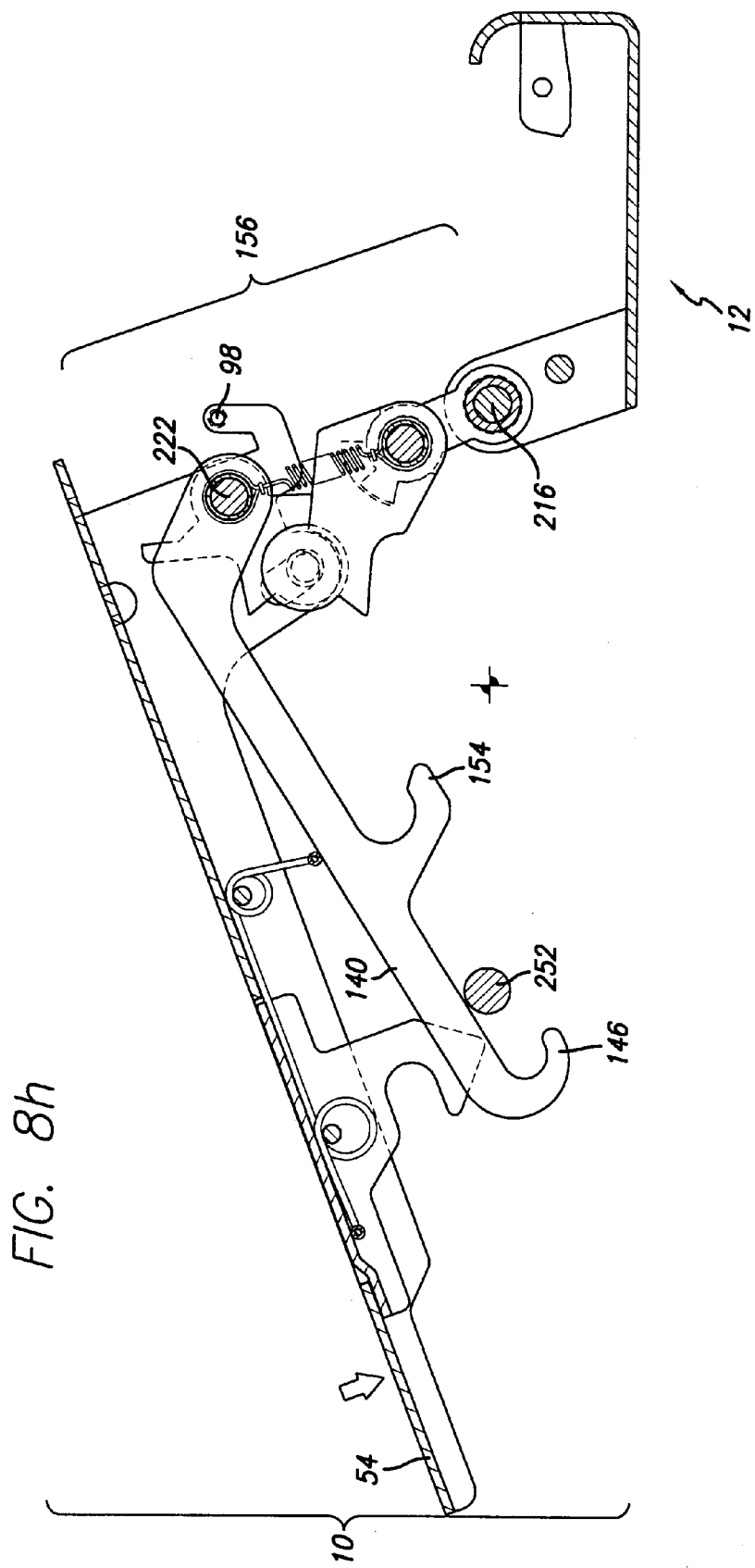
FIG. 8h is sectional view of a cinch-up latch with a linkage, hook, and handle rotated in an extend each position with the hook disengaged from a keeper.

Referring to FIG. 8g, the rounded end 98 of the handle 54 is no longer positioned below the mounting ear 34 of the bracket 12, the linkage 156, hook 140, and handle can be rotated counterclockwise as a single unit relative to the bracket pin 216 and the page. With reference to FIG. 8h, as the linkage, hook, and handle are rotated counterclockwise about the bracket pin, there comes a point where the curved end 146 of the hook disengages the keeper 252.

Accordingly, the curved end 146 of the hook 140 can be moved so as to engage a keeper 252 distant from the bracket 12. Also, the cinch-up latch 10 has the advantage of providing a slight upward force when the cinch-up latch is initially opened, and a slight downward force as the cinch-up latch is nearly closed. These slight upward and downward forces assist the operator in opening and closing the cinch-up latch. Another advantage of the cinch-up latch is that the hook has a safety curved end 154 which helps secure the hook and prevents the hook from rotating about the common pin 222 when the cinch-up latch is closed.

Figure 9A:
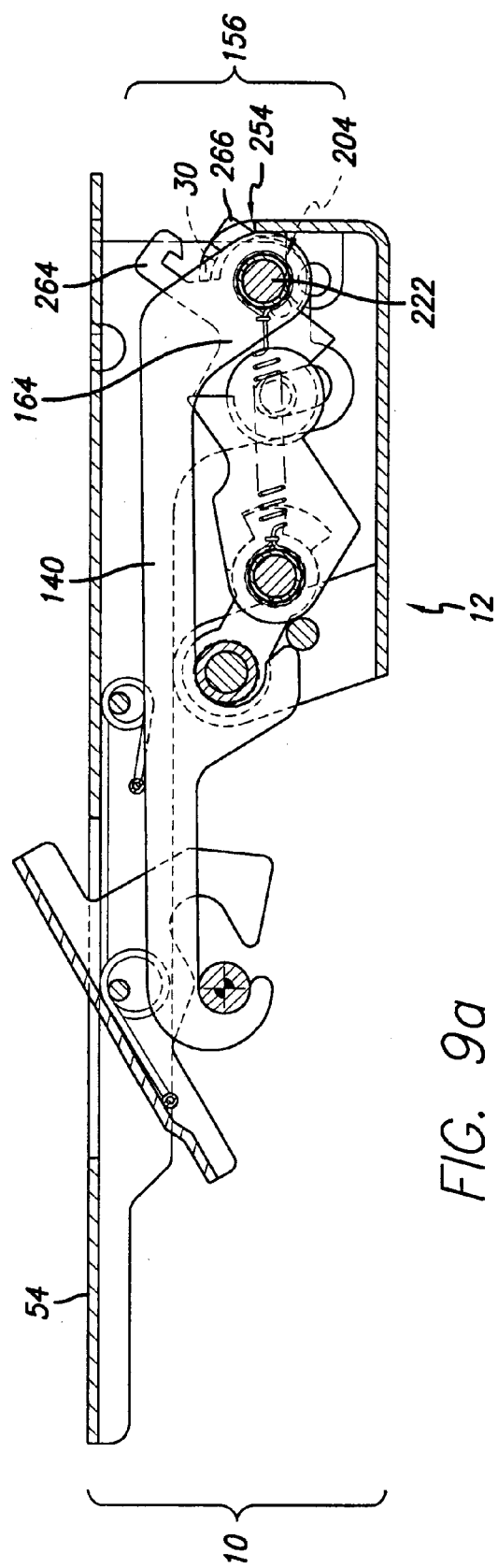
FIG. 9a is a sectional view of a second embodiment of a cinch-up latch in the closed position, with a depressed trigger lock, and a common link extension inserted into a bracket notch.

The present invention is capable of other and different embodiments, and its several details are capable of modification. For example, another embodiment configured according to the present invention is shown in FIG. 9a, which is a sectional view of a second embodiment of the cinch-up latch 10. Where appropriate, the same reference numbers are used to avoid unnecessary duplication and description of similar elements already referred to and described above.

Figure 10:
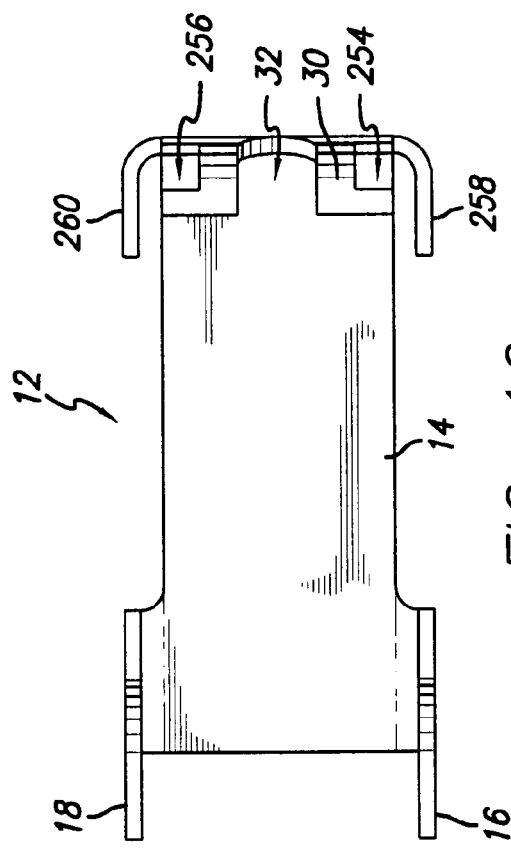
Figure 11:
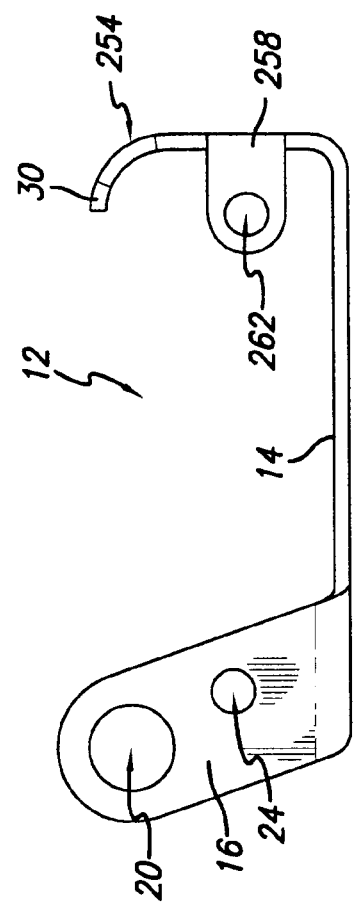
Figure 12:
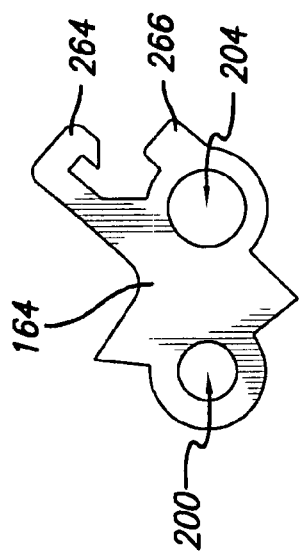

With reference to FIGS. 10 and 11, in addition to the central notch 32 which provides clearance for the hook 140, the bracket 12 of the second embodiment of the cinch-up latch 10 includes a pair of bracket notches 254 and 256. The bracket also includes a pair of mounting tabs 258 and 260. The mounting tabs are rounded in shape and do not include the downward camming surfaces 42 (one shown), or the upward camming surfaces 46 (one shown) of the first embodiment. The mounting tabs of the second embodiment include aligned tab holes 262 (one shown), respectively, for receipt of fasteners (not shown) to mount the bracket to the aircraft panel (not shown). The mounting tabs of the second embodiment of the cinch-up latch are formed from the same piece of metal as the curved lip 30.

As shown in FIG. 9a, the handle 54 of the second embodiment of the cinch-up latch 10 does not include the pair of arms 94 and 96, or the rounded ends 98 and 100. The common links 164 and 166 (one shown) of the second embodiment include common link curved ends 264 (one shown), respectively, instead of the common link fingers 208 and 210, respectively, of the first embodiment. The common links of the second embodiment also include common link extensions 266 (one shown), respectively, adjacent to the common link mounting holes 204 and 206 (one shown), respectively, and below the common link curved ends. This configuration assists in securing the cinch-up latch by preventing motion of the common links relative to the bracket 12 (FIG. 9a).

Figure 9B:
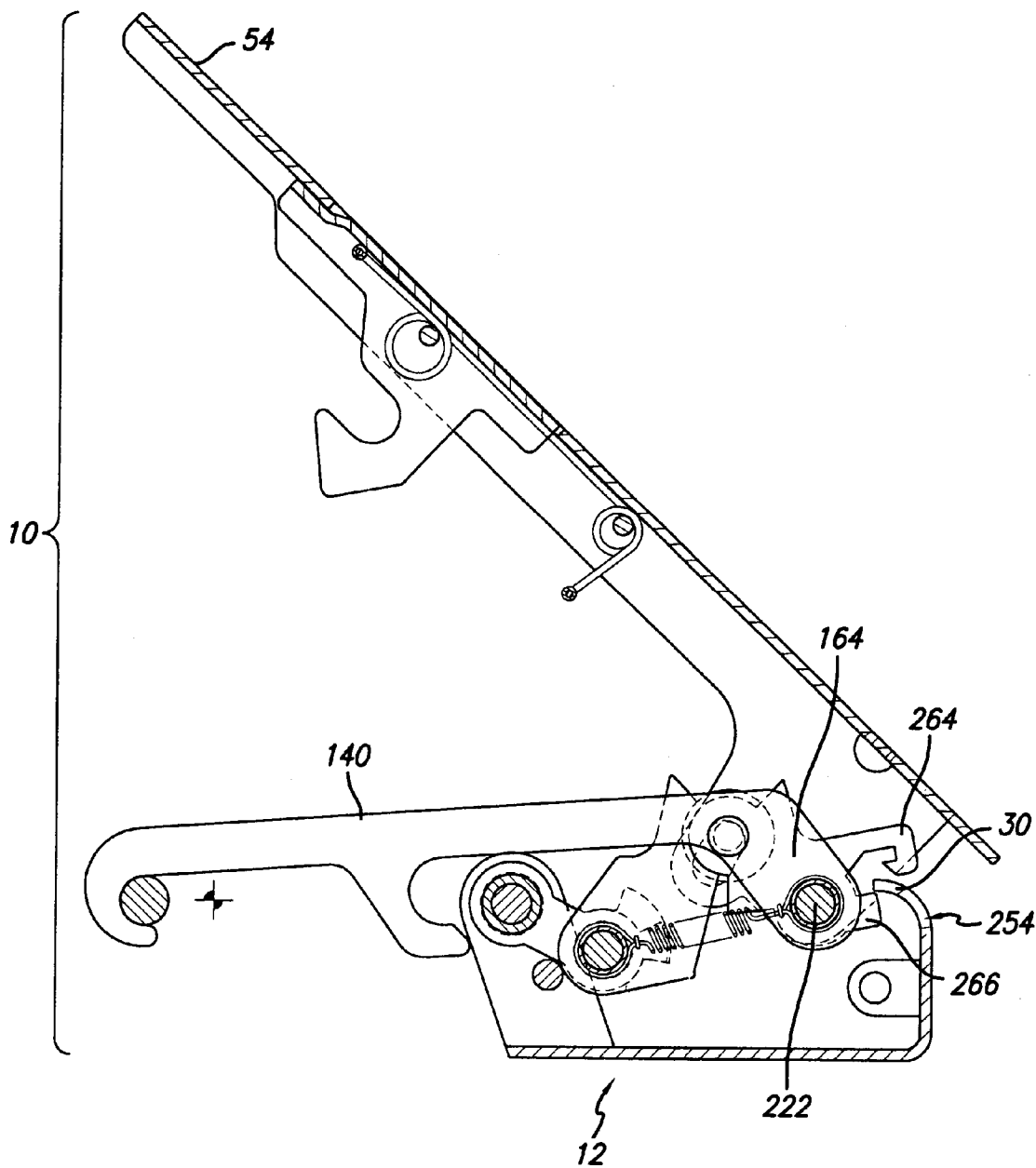
FIG. 9b sectional view of a second embodiment of a cinch-up latch with a linkage no longer in the over-center position.

The method of use and operation of the second embodiment of the cinch-up latch 10, constructed and described above, proceeds as follows. It shall be appreciated that FIGS. 9a, 9b, and 9c illustrate the operation of the second embodiment of the cinch-up latch and are sectional views, and therefore, the description of operation as to the illustrated sectional view applies to the other corresponding half of the second embodiment of the cinch-up latch.

With particular reference to FIG. 9a, when the second embodiment of the cinch-up latch 10 is properly closed, the linkage 156 is in its over-center position with the common link extension 266 inserted into the bracket notch 254. As the handle 54 is lifted upward and out of its closed position the linkage moves out of its over-center position, the common link 164 rotates clockwise about the common pin 222 and the common link extension moves out of the bracket notch as shown in FIG. 9b. Also, the common link curved end 264 moves closer to the curved lip 30 of the bracket 12 as the common link rotates with the handle.

FIG. 9c shows the second embodiment of the cinch-up latch 10 with the handle 54 in an open position and perpendicular to the rectangular base plate 14 of the bracket 12. The common link curved end 264 is inserted through the bracket notch 254 and secures the handle, hook 140 and linkage 156 to the curved lip 30 securing the common link 164 to the bracket.

Those skilled in the art will recognize that other modifications and variations can be made in the cinch-up latch of the invention and in the construction and operation of the cinch-up latch without departing from the scope or spirit of this invention. For example, it should be understood that this device could also be used to secure a variety of different panels to various types of structures. With such possibilities in mind, the invention is defined with reference to the following claims.

I claim:

1. A cinch-up latch for securing an aircraft panel to a keeper, the latch comprising:
    a bracket;
    a handle moveable between a closed and an open position, the handle having a handle base plate;
    a trigger lock pivotably mounted to the handle for engagement with the keeper, the trigger lock engaged with the keeper when the handle is in the closed position and the trigger lock disengaged from the keeper when the handle is in an open position;
    a hook rotatably mounted to the handle for engagement with the keeper; and
    a linkage, rotatably mounted to the bracket, the handle, and the hook, the linkage having an over-center position preventing the hook from disengaging the keeper when the handle is in the closed position, the trigger lock engages the linkage when the handle is in the closed position.

2. The cinch-up latch of claim 1, further comprising a trigger spring assembly interfaced with the trigger lock to urge the trigger lock toward a flush position relative to the handle base plate.

3. The cinch-up latch of claim 2, wherein the trigger spring assembly additionally interfaces with the handle to urge the handle toward an open position.

4. The cinch-up latch of claim 1, wherein the hook includes a curved end for engaging the keeper, a base end rotatably mounted to the handle and linkage, and a central body located between the curved end and the base end.

5. The cinch-up latch of claim 4, wherein the central body of the hook includes a safety curved end which engages the linkage when the linkage is in the over-center position.

6. The cinch-up latch of claim 1, wherein the handle includes at least one curved channel and the linkage includes at least one common link interface pin, where the at least one common link interface pin is positioned within the at least one curved channel.

7. The cinch-up latch of claim 1, wherein the linkage includes an elongated link, a pair of connecting links, and a pair of common links, each having opposing ends, one end of the elongated link rotatably mounted to the bracket, the opposing end of the elongated link rotatably connected to one end of the pair of connecting links, the opposing end of the pair of connecting links rotatably connected to one end of the pair of common links, the opposing end of the pair of common links rotatably mounted to the handle and the hook.

8. The cinch-up latch of claim 1, wherein the bracket includes a curved lip.

9. The cinch-up latch of claim 8, wherein the linkage includes at least one common link curved end and at least one common link extension, and the curved lip of the bracket includes at least one bracket notch to receive the at least one common link curved end or the at least one common link extension, or to provide clearance for the hook.

10. The cinch-up latch of claim 1, wherein the bracket includes at least one mounting ear and at least one camming surface located on the at least one mounting ear.

11. The cinch-up latch of claim 10, wherein the handle includes at least one rounded end which contacts the at least one mounting ear and rides against the at least one camming surface when the handle moves between the closed position and an open position.

12. A cinch-up latch for securing an aircraft panel to a keeper, the latch comprising:
   a bracket;
   a handle moveable between a closed and an open position, the handle having a base plate;
   a trigger lock pivotably mounted to the handle for engagement with the keeper, the trigger lock engaged with the keeper when the handle is in the closed position and the trigger lock disengaged from the keeper when the handle is in an open position;
   a trigger spring assembly interfaced with the handle and the trigger lock to urge the handle toward an open position and the trigger lock toward a flush position relative to the handle base plate;
   a hook rotatably mounted to the handle, the hook including:
      a curved end for engagement with the keeper and an opposing base end rotatably mounted to the handle;
      a central body located between the curved end and the base end; and
      a safety curved end, located on the central body of the hook; and
   a linkage, rotatably mounted to the bracket, the handle, and the base end of the hook, the linkage having an over-center position preventing the hook from disengaging the keeper when the handle is in the closed position, the safety curved end of the hook engaging the linkage when the linkage is in the over-center position, the trigger lock engaging the linkage when the handle is in the closed position.

13. The cinch-up latch of claim 12, wherein the handle includes at least one curved channel and the linkage includes at least one common link interface pin where the at least one common link interface pin is positioned within the at least one curved channel.

14. The cinch-up latch of claim 12, wherein the linkage includes an elongated link, a pair of connecting links, and a pair of common links, each having opposing ends, one end of the elongated link rotatably mounted to the bracket, the opposing end of the elongated link rotatably connected to one end of the pair of connecting links, the opposing end of the pair of connecting links rotatably connected to one end of the pair of common links, the opposing end of the pair of common links rotatably mounted to the handle and the hook.

15. The cinch-up latch of claim 12, wherein the bracket includes a curved lip.

16. The cinch-up latch of claim 15, wherein the linkage includes at least one common link curved end and at least one common link extension, and the curved lip of the bracket includes at least one bracket notch to receive the at least one common link curved end or the at least one common link extension, or to provide clearance for the hook.

17. The cinch-up latch of claim 12, wherein the bracket includes at least one mounting ear and at least one camming surface located on the at least one mounting ear.

18. The cinch-up latch of claim 17, wherein the handle includes at least one rounded end which contacts the at least one mounting ear and rides against the at least one camming surface when the handle moves between the closed position and an open position.

19. A cinch-up latch for securing an aircraft panel to a keeper, the latch comprising:
   a bracket including:
      at least one mounting ear; and
      at least one camming surface located on the at least one mounting ear;
   a handle, moveable between a closed and an open position, including:
      a handle base plate;
      at least one curved channel; and
      at least one rounded end which contacts the at least one mounting ear and rides against the at least one camming surface when the handle moves between the closed position and an open position;
   a trigger lock pivotably mounted to the handle for engagement with the keeper, the trigger lock engaged with the keeper when the handle is in the closed position and the trigger lock disengaged from the keeper when the handle is in an open position;
   a trigger spring assembly interfaced with the handle and the trigger lock and to urge the handle toward an open position and the trigger lock toward a flush position relative to the handle base plate;
   a hook rotatably mounted to the handle, the hook including:
      a curved end for engagement with a keeper and an opposing base end rotatably mounted to the handle;
      a central body located between the curved end and the base end; and
      a safety curved end, located on the central body of the hook; and a linkage, rotatably mounted to the bracket, the handle, and the base end of the hook, the trigger lock engaging the linkage when the handle is in the closed position, the linkage having;
  an over-center position preventing the hook from disengaging the keeper when the handle is in the closed position, the safety curved end of the hook engaging the linkage when the linkage is in the over-center position:
    at least one common link interface pin positioned within the at least one curved channel of the handle; and
  an elongated link, a pair of connecting links, and a pair of common links, each having opposing ends, one end of the elongated link rotatably mounted to the bracket, the opposing end of the elongated link rotatably connected to one end of the pair of connecting links, the opposing end of the pair of connecting links rotatably connected to one end of the pair of common links, the opposing end of the pair of common links is rotatably mounted to the handle and the hook.

* * * * *